No. 703,111. Patented June 24, 1902.
C. BIERNBAUM.
EGG SEPARATOR.
(Application filed Aug. 29, 1901.)
(No Model.)

Witnesses:
E. B. Bolton
Anna S. Bissing

Inventor:
Charles Biernbaum
By Otto Munk
his Attorney.

UNITED STATES PATENT OFFICE.

CHARLES BIERNBAUM, OF NEWARK, NEW JERSEY, ASSIGNOR TO ADOLPH DEGERDON, OF JERSEY CITY, NEW JERSEY.

EGG-SEPARATOR.

SPECIFICATION forming part of Letters Patent No. 703,111, dated June 24, 1902.

Application filed August 29, 1901. Serial No. 73,721. (No model.)

*To all whom it may concern:*

Be it known that I, CHARLES BIERNBAUM, a subject of the German Emperor, and a resident of Newark, New Jersey, have invented a certain new and useful Egg-Separator, of which the following is a full, clear, and exact specification.

It has heretofore been the usual practice in most bakeries to separate the yolks from the whites of eggs by hand, this process being tedious and slow and not producing satisfactory results. My invention is designed to provide mechanical means to effect this separation, resulting in a great saving of time and labor and a greater thoroughness in the work performed.

The invention consists, substantially, of a cylinder, a spout partly secured therein, a cup in said spout for containing the yolks, and a chute provided with shoulders in communication with the cup and spout.

For a more detailed description of my invention I refer to the accompanying drawings, wherein similar letters of reference refer to similar parts throughout the several views, and in which—

Figure 1:
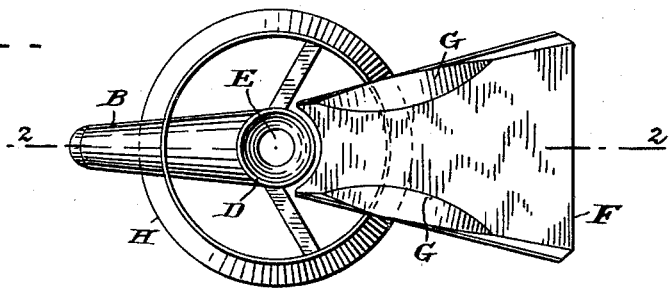
Figure 2:
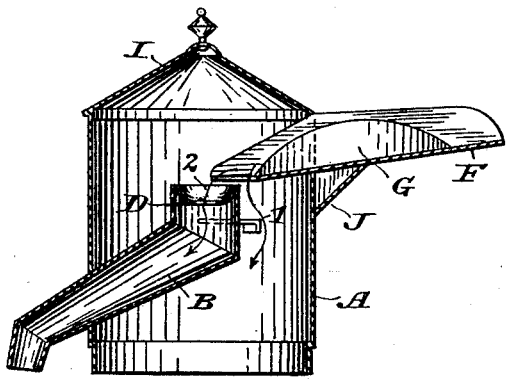
Figure 3:
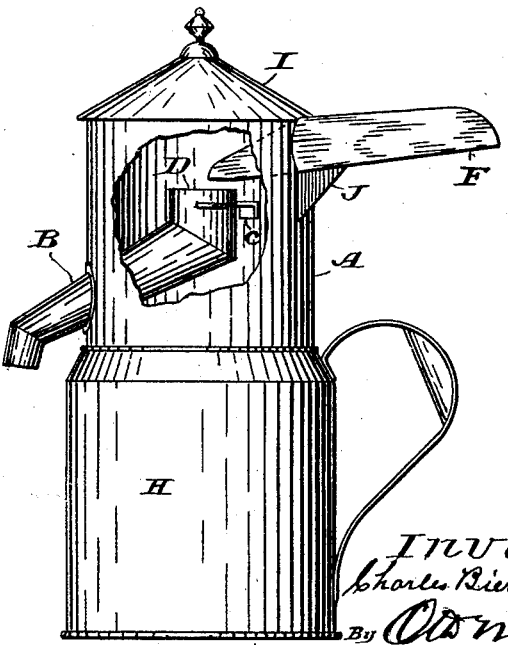

Figure 1 is a top plan view of my invention. Fig. 2 is a vertical sectional view taken on the line 2 2 of Fig. 1; and Fig. 3 is a side view, part of the cylinder being broken away to more clearly show the interior construction.

In the drawings, A is the cylinder, to which is secured the spout B by support C on the interior of the cylinder. At the upper part of the spout B, which projects beyond and on the exterior of the cylinder A, is an annular cup D, having an aperture E at about its center. To the upper part of the cylinder A is secured a slightly-inclined chute F, provided with shoulders or ridges G and supported on the side of the cylinder by a brace J. The said chute projects into the cylinder A and in close proximity to the cup D. The lower part of the cylinder A may be provided with a rim K for insertion into a can or other receptacle H. I may also provide a cover or lid I for the device.

The operation of the invention is as follows: The shell of the egg is removed and the egg permitted to fall on the chute F, down which it will slide, guided by the shoulders G, the yolk, owing to its greater specific gravity, advancing at a greater rate of speed than the white. Part of the white of the egg will fall in the direction of the arrow 1, (shown in Fig. 2,) while the yolk of the egg will fall into the cup D and down into the spout, as indicated by arrow 2 in Fig. 2. When the yolk of the egg reaches the cup D, part of the white still clings to it, and this is removed by the sharp edges of the cup, the latter being of such size as to contain an average-sized yolk, and the white runs down the sides of the spout into the can H. The yolk of the egg, being separated from the white, falls through the aperture E in the cup D into the spout B, down which it passes into a receptacle provided to receive it.

While throughout this specification I have used the term "cylinder," I do not wish to confine my invention to any particular shape or construction of device, but may use any other form of open or closed receptacle or container suitable for the purpose. I may also use or omit the can H and lid.

Having now described my invention, what I claim as new, and desire to secure by Letters Patent, is—

1. An egg-separator comprising a perforated cup adapted to receive the yolk, and an inclined chute leading to and spaced from the cup, substantially as described.

2. An egg-separator comprising a cup adapted to receive the yolk and a chute leading to and spaced from the cup, substantially as described.

3. In an egg-separator, a cup adapted to receive the yolk and having an opening to discharge the same, a chute provided with shoulders or ridges adapted to receive the egg from the shell, the end of the chute being placed a distance from the cup, adapted to allow the white of the egg to be separated from the yolk, the yolk being discharged into the cup by reason of its greater specific gravity, while the white falls through the space between the chute and cup, substantially as described.

4. In an egg-separator, a cup adapted to receive the yolk, having an opening for the discharge of the yolk, a spout for directing the yolk to a suitable receptacle, a chute adapted to receive the egg from the shell, said chute directing the yolk to the cup but leaving an intervening space between the chute and cup to allow the discharge of the white and a receptacle to receive the white.

In testimony whereof I have hereunto set my hand, this 24th day of August, 1901, in the presence of two subscribing witnesses.

CHARLES BIERNBAUM.

Witnesses:
 THEO. WESTERMAN,
 JOSEPH J. SABO.